United States Patent [19]

Namdari

[11] Patent Number: 4,690,048
[45] Date of Patent: Sep. 1, 1987

[54] NUTCRACKER

[76] Inventor: Bahram Namdari, P.O. Box 17366, Milwaukee, Wis. 53217

[21] Appl. No.: 740,568

[22] Filed: Jun. 3, 1985

[51] Int. Cl.⁴ .............................................. A23N 5/00
[52] U.S. Cl. ........................................ 99/575; 99/574
[58] Field of Search .......... 99/568, 571, 572, 574–576, 99/579, 580–582; 426/482

[56] References Cited

U.S. PATENT DOCUMENTS

| | | | |
|---|---|---|---|
| 2,321,795 | 6/1943 | Buckman | 99/575 |
| 3,622,799 | 5/1972 | Shaw | 99/574 |
| 4,201,126 | 5/1980 | Evans | 99/574 |
| 4,218,968 | 8/1980 | Livingston | 99/575 X |

Primary Examiner—Timothy F. Simone
Attorney, Agent, or Firm—Andrus, Sceales, Starke & Sawall

[57] ABSTRACT

A nutcraker comprises a pair of relatively rotatable discs (manually or motor operated) defining a space in which a nut to be cracked is directed by an upper intake chute and from which the cracked shell and freed nutmeat are directed by a lower discharge chute. The rotatable disc comprises nut-receiving recesses and projections for pushing the nut. The stationary disc comprises space-restricting components, such as a sloped surface or groove and a tapered wall, which define a space which gradually decreases in width and height. As the nut is moved through this space its shell is cracked and the nutmeat freed. Nutcrackers designed to process nuts of different sizes can be ganged together and driven by a common power source. In some embodiments the nut-receiving chamber contains components which automatically adjust to the size of a nut placed therein and releasably lock into such position. In another embodiment the two discs define several spaces of different sizes.

10 Claims, 30 Drawing Figures

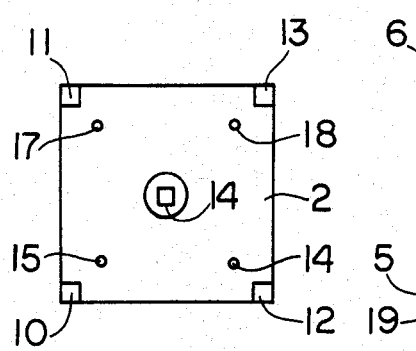
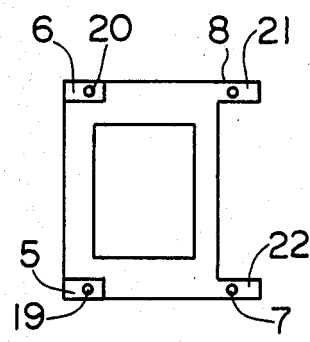
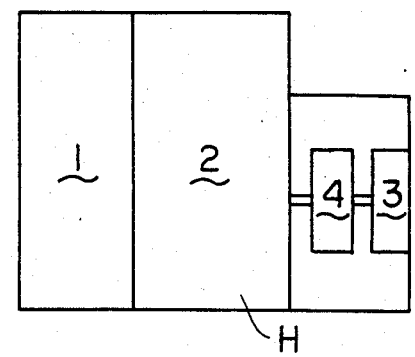
FIG. 3   FIG. 2   FIG. 1
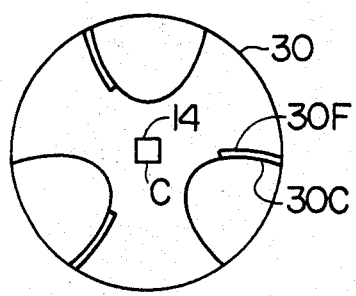
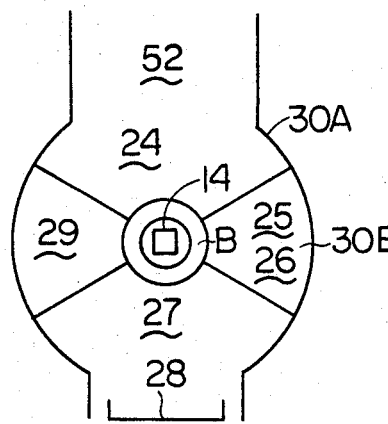
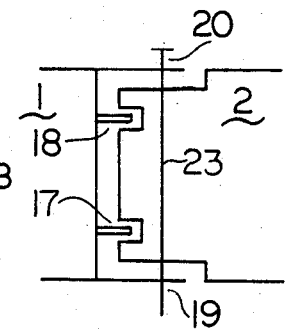
FIG. 6   FIG. 5   FIG. 4
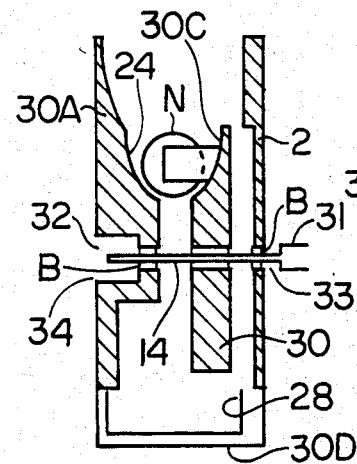
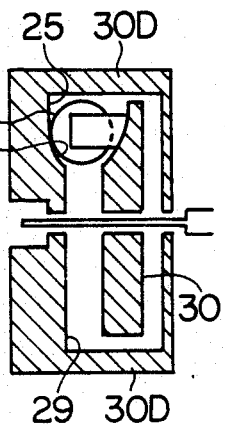
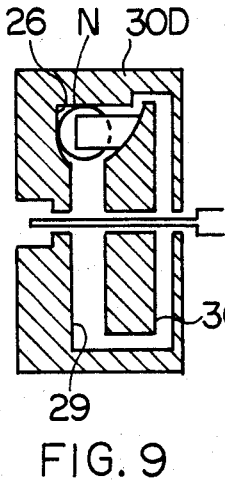
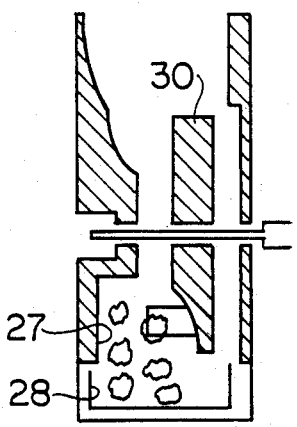
FIG. 7   FIG. 8   FIG. 9   FIG. 10

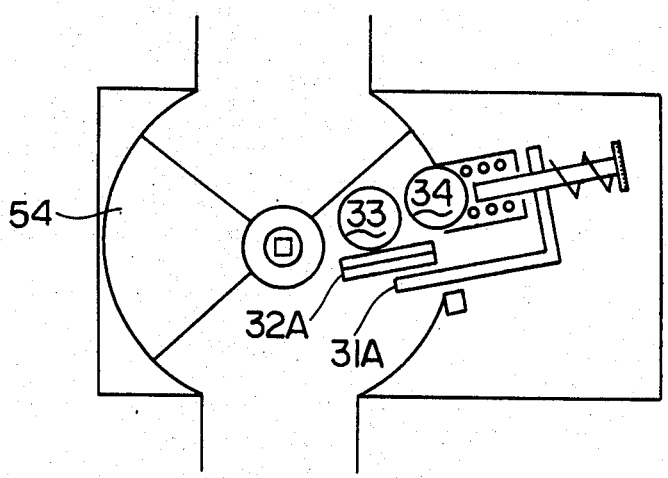
FIG. 17
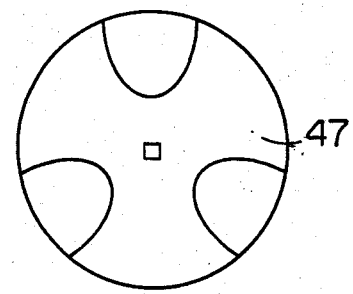
FIG. 18
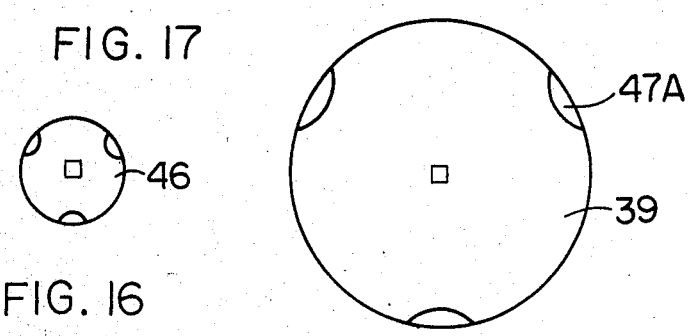
FIG. 16
FIG. 19
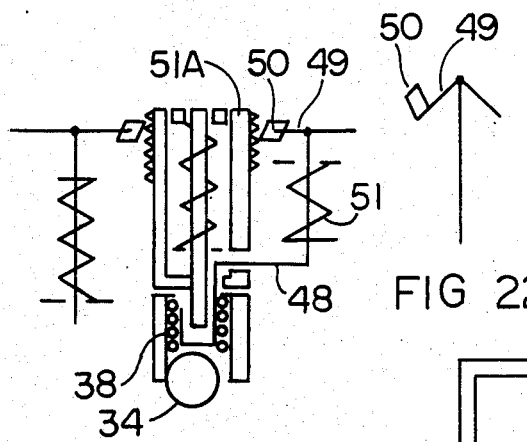
FIG. 23
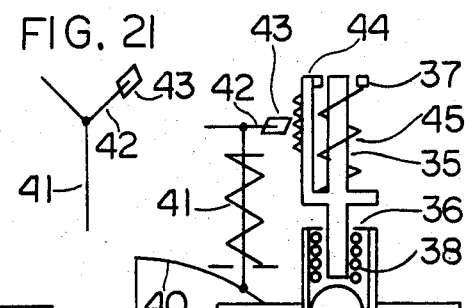
FIG. 21
FIG. 22
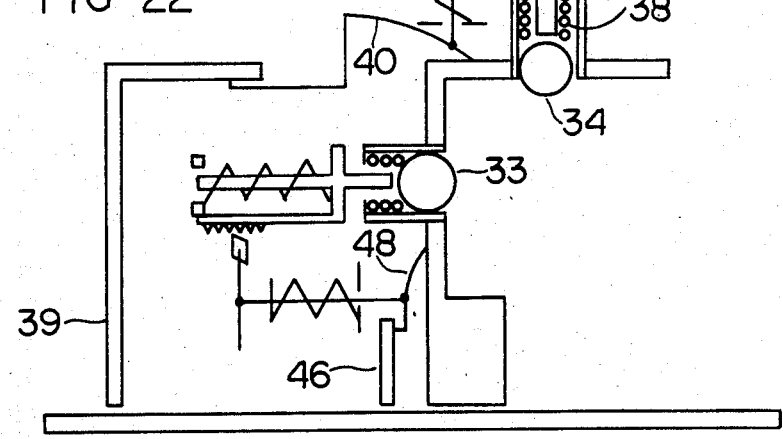
FIG. 20

NUTCRACKER

BACKGROUND OF THE INVENTION

1. Field of Use

This invention relates generally to nutcrackers which employ relatively rotatable discs or members between which a nut is inserted so that its shell can be cracked and the nutmeat freed.

2. Description of the Prior Art

Hand-powered or motor-driven nutcrackers of the aforesaid character and of relatively large size are known and the following U.S. patents illustrate the state of the art: U.S. Pat. Nos. 2,631,626; 2,321,795; 2,062,534; 1,591,251; 1,330,442; 1,274,803; 1,178,075; 1,073,165. In some of these prior art nutcrackers, one or both of the discs between which the nut is inserted present conical surfaces and thus, the broken shell and freed nutmeat can fall into a space which decreases in size thereby causing the nutmeat to be too finely broken or ground up. Furthermore, the prior art nutcrackers did not provide a sure means to trap the nut between the discs as the discs rotated and the nut was free to bounce between the discs until accidental entrapment occured.

SUMMARY OF THE PRESENT INVENTION

In accordance with the present invention there is provided a new and improved nutcracker of relatively small size which can be operated manually or by motor power, individually or in a gang with other units, to crack or shell nuts and free the nutmeat therein.

In its broad aspect, a nutcracker in accordance with the present invention comprises a pair of relatively rotatable disc members; means for supporting the discs for such relative rotation and for maintaining the discs spaced apart at a fixed distance; one or more nut-receiving recesses and nut-pushing projections on the rotatable disc; and restricting means on the face of the stationary disc which cooperate with the recess in the rotatable disc to define a space which diminishes in size in at least one direction whereby a nut being moved through said space is squeezed and its shell cracked and broken to free the nutmeat therein. The aforesaid restricting means includes a tapered or sloped groove which narrows the space between the discs and may also include a tapered peripheral wall which narrows or decreases the size of the space in another direction.

The nutcracker is designed to accommodate nuts of specific average size. In one embodiment the nut-receiving chamber contains components which automatically adjust to the size of a nut placed therein and releasably lock into place therearound as the nut is further processed and cracked, so cracking the shell and leaving the meat intact. In another embodiment the two discs define several sloped grooves and associate tapered walls of different sizes to accommodate nuts of different sizes.

Nutcrackers in accordance with the present invention offer several advantages over the prior art. For example, one unit or several ganged units of different sizes are small enough for convenient use on a dinner table or cocktail table. The unit, though small, readily exerts great force and is capable of cracking nuts having very hard shells. A single unit can be designed to process nuts of a particular size or shape (compare, for example, the differences between walnuts, hickory nuts, filberts, almonds, etc.). Since the units can be designed to accommodate nuts of a certain average size, the chances of breaking or grinding a freed nutmeat into unduly small particles is greatly reduced. Furthermore, a single unit can be designed to process nuts of different sizes. Other objects and advantages of the invention will hereinafter appear.

DRAWINGS

FIG. 1 is a schematic side elevation view of two nutcracker units of different size ganged together and driven by a common power source in accordance with the present invention;

FIG. 2 is a top plan view of one of the units of FIG. 1;

FIG. 3 is an end elevation view of the unit of FIG. 2;

FIG. 4 is a schematic diagram showing how the units of FIG. 1 are secured together;

FIG. 5 is an elevation view of the inner surface of the stationary disc of the nutcracker unit of FIGS. 2 and 3:

FIG. 6 is a view similar to FIG. 5 of the rotatable disc of the nutcracker unit of FIGS. 2 and 3;

FIGS. 7, 8, 9 and 10 are cross-section views of one of the units showing its components in various operating positions;

FIGS. 16 through 19 are views of various components employed in the second embodiment;

FIGS. 20 through 23 are greatly enlarged views in schematic form of components which are employed in the structure shown in FIG. 12;

DESCRIPTION OF PREFERRED EMBODIMENTS

Figure 3A:
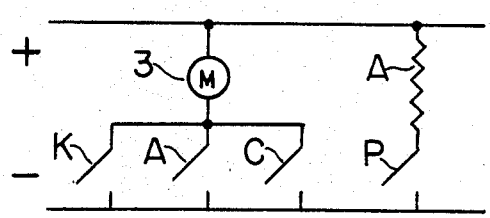
FIGS. 3A and 3B are motor control circuit diagrams.

FIGS. 1 through 4 are directed to certain features which pertain to securing several units together and which are common to all embodiments. FIGS. 5 through 10 are directed to a first embodiment of the invention. FIGS. 11 through 23 are directed to a second embodiment of the invention. FIGS. 24 through 28 are directed to a third embodiment of the invention.

General Arrangement

Each of the several embodiments or units for cracking a nut N comprises a housing H, a pair of relatively rotatable members in the form of a stationary disc or member 30A, a rotatable disc or member 30, a shaft or axle 14 which is mounted by means of bearings B for rotation on stationary disc 30A and which is rigidly secured as at C to rotatable disc 30 to effect rotation thereof. Stationary member 30A may be combined with or form part of housing H. Shaft 14 is adapted to be rotated manually as by a handle (not shown) or by a power source such as an electric motor 3 (shown in FIG. 1). Furthermore, shaft 14 is provided with interlockable male and female fittings 32 and 31, respectively, at its opposite ends (see FIG. 7) whereby when several units are ganged end-to-end their shafts 14 may be drivably interconnected, as shown in FIG. 1 and explained in connection with FIGS. 2 and 3. Inlet and outlet ports or chutes 52 and 27, respectively, are provided.

FIG. 1 shows a side view of two nutcracker units 1 and 2 ganged together in combination with a drive motor 3 and reduction gears 4. FIG. 2 shows the top of unit 2 and areas 5 and 6 thereon are depressions that receive corresponding tongues from the adjacent unit such as is shown at 7 and 8. FIG. 3 shows the side of unit 2 and shows four depressions 10, 11, 12 and 13 at the four corners. FIG. 3 also shows the shaft 14 that is connectable with the shaft from the next unit. The numerals 15, 16 and 17 and 18 designate depressions that accept additional pin-like protrusions from the adjacent unit to keep the drive-shaft axes of the units in alignment after the shafts 14 have been interconnected so that the units operate without imposing any strain on motor 3. The numerals 19, 20, 21 and 22 designate grooves or tracks for securing the units together with pins, such as pin 23, as shown in FIG. 4.

First Embodiment

As FIGS. 5 through 10 show, the first embodiment or nutcracker unit 1A comprises stationary member 30A (FIG. 5) which is provided on its inner face with a groove 30B which includes the depressed regions 24 (FIG. 7), 25 (FIG. 8) and 26 (FIG. 9) which become progressively shallower. Region 27 is the widest or deepest portion on member 30A and region 29 is the maximum thickness of member 30A. Rotary member 30 (FIG. 6) is provided on its inner face with a plurality (three shown) of nut-receiving recesses 30C. A recess 30C in disc 30 cooperates with groove 30B in disc 30A as disc 30 rotates to define a space in which a nut N is contained or moves and which gets progressively smaller in a direction parallel to the axis of shaft 14. Member 30A also includes an integrally formed outer peripheral wall 30D which, as comparison of FIGS. 8 and 9 shows, gradually increases in thickness to cause the space in which the nut is contained also to get progressively smaller in a direction normal to the axis of shaft 14. As the nut is moved through the unit 2 it becomes wedged between members 30 and 30A and its shell cracks. The pieces of the broken shell and the freed nutmeat fall into a tray 28 (FIG. 10). Disc 30 is provided with pusher blades 30F, each adjacent to a side of a recess 30C, which push the nut through the narrowing passage.

As the recess 30C in disc 30 moves opposite area 29 in disc 30A, all nut pieces have dropped therefrom. Area or region 29 is as shown in FIGS. 8 and 9 and is a thin space definer which will now allow an uncracked nut to complete 360 degree cycle but will cause the nut to fall into the tray.

FIG. 6 shows three recesses 30C in disc 30 but this number could be more or less.

As FIGS. 7, 8, 9 and 10 show, there is an engagement socket 31 at the end of each shaft 14 for cooperation with member 32 of an adjacent unit as hereinbelow explained. Shaft 14 is of square cross section and the ball bearings B are provided with a correspondingly shaped opening therethrough. The central hole in disc 30 is also of square cross section to receive shaft 14 so that rotation of the shaft causes rotation of disc 30.

Second Embodiment

As FIGS. 11 through 23 show, the second embodiment or nutcracker unit 2A comprises a stationary disc or member 53 and a rotatable disc 47. A pusher blade 30C is provided on disc 47 adjacent to its recess 30C (see FIG. 15). It is to be understood that stationary member 53 is not provided with a sloped groove such as is provided in unit 2 hereinbefore described. Instead, unit 2A comprises barrier members 31A and 32A, hereinafter described, which serve to define a closely confined space through which a nut is moved and against which the nut is forced and cracked. Unit 2A is designed so that the nut is first passed between two spheres or cylinders 33 and 34 (which could have some other shape if desired) and the nut pushes the spheres inwardly on their mounting means, as is best seen in FIG. 12, so that the barrier members 31A and 32A attached to the mechanisms associated with each sphere will move out of the way of the passing nut. Barrier 31A is best seen in FIG. 17. Barrier 32A is associated with sphere 33 and, because of its position only the cross-section thereof is shown in FIG. 17. The barrier mechanisms are shown in detail in FIGS. 12 and 17 and is greatly enlarged and expanded upon in FIG. 20. As was mentioned, the spheres 33 and 34 are pressed inwardly to an extend determined by the size of the nut moving therepast. When, for example, sphere 34 is pressed in, it causes the rod 35 to be pushed up. Rod 35 is held precisely in place by guiding members such as 36 and 37. When rod 35 is pushed up, as is shown in FIG. 17, the barrier 31A moves up with it and, as soon as the nut passes the sphere 34, spring 38 brings ball 34 down to its normal or deactivated position. After the nut has passed barrier 31A and has been crushed and cracked thereagainst, revolving disc 39 will push an arm 40 downwardly and that will cause the rod 41 to be pulled down. This, in effect, will bend the arm 42, as is shown in FIG. 21. This will pull the stopper 43 and disengage it from the ratchet teeth of an accessory arm 44 which is attached to rod 35. This allows rod 35 to move down under the force of spring 45, so that the stopper 31A will return to its original position and be ready for the next nut. The other sphere or ball 33 functions in the same manner as above-described, only in this case the disc 46 neutralizes the operating mechanism after the nut passes the sphere. As shown in FIG. 19, disc 39 has along its periphery three enlarged areas and disc 46, as shown in FIG. 16, also has three enlarged areas 47A on its surface. The areas 47A are positioned relative to disc 47 that moves the nut around, as shown in FIG. 18, so that as the nut passes barriers 31A and 32A, these enlarged areas or protrusions will act on arms 40 and 48 and cause the barriers to return to their neutral or starting positions. It should be noted that the roll of stopper 43 is to prevent arm 35 from coming down until the nut has been cracked by barrier 31A.

It may not at first appear that as the nut passes and presses against barrier 31 it can push rod 35 up because of the direction in which the force is exerted by the nut against this barrier. However, a mechanism is provided, as shown in FIG. 23, to prevent this, if it proves to be a problem. In this case, as sphere 34 is pushed upward first and pushes rod 48 up, that will bend arm 49 at its hinge and this will cause the stopper 50 to be pulled out of the way of the ratchet teeth in the accessory arm 51A. Arm 51A, like arm 44, is attached to rod 35 and stopper 31. As the nut passes sphere 34, the rod 48 is returned to its original or starting position by spring 51 and so the stopper 50 will prevent rod 35 from being pushed up while the nut passes barrier 31. Since the mechanism associated with sphere 33 is exactly the same as that for sphere 34, it is not necessary to describe it here in detail.

Figure 11:
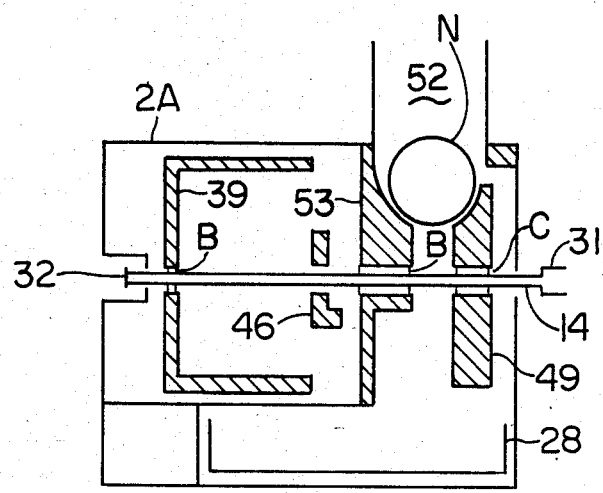
FIGS. 11 through 15 are cross-section views of a second embodiment of the invention and show the components thereof in various operating positions.
Figure 12:
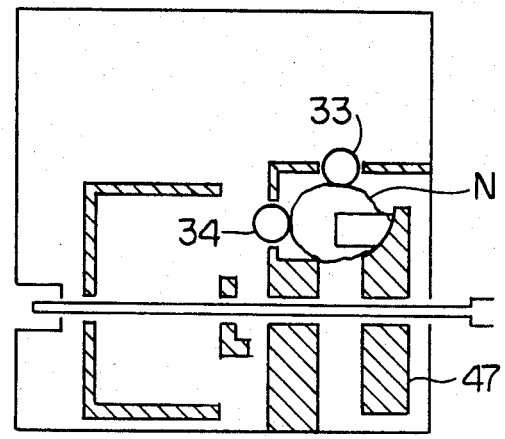
Figure 13:
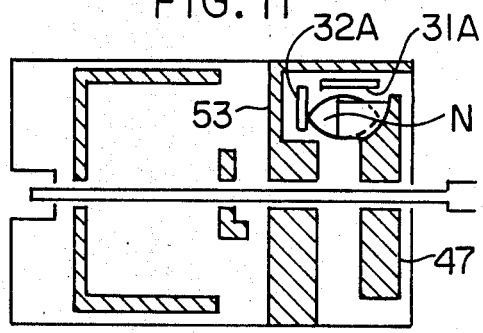
Figure 14:
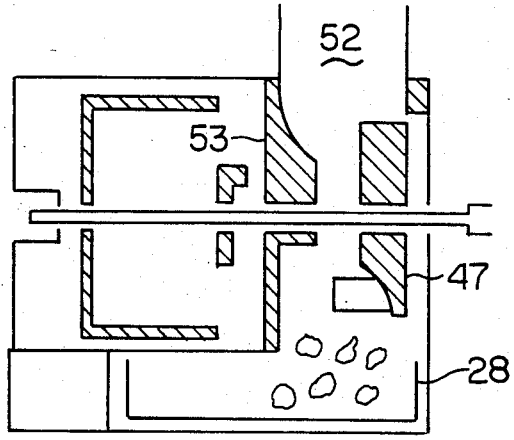
Figure 15:
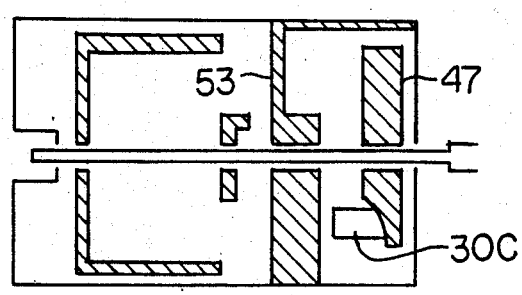

FIG. 11 shows that a nut N has been introduced into the unit 2A through opening 52 between stationary member 53 and the revolving disc 47. FIG. 12 shows that the nut has advanced and is ready to press against the spheres 33 and 34, which as shown, form two sides of a passage and are located on the same line. FIG. 13 shows that the nut has been cracked between barrier 31A and 32A by disc 47 and, as the disc 47 revolves further, as FIG. 14 shows, the broken shell and nutmeat fall into the tray. FIG. 15 shows that the depression that received the nut N is at the region designated 54 in FIG. 17 and the materials at this point have already fallen down and cannot pass this region.

Third Embodiment

As FIGS. 24 through 28 show, the third embodiment or nutcracker unit 3A comprises a stationary member 53A and a rotatable disc 47A. Unit 3A is used for cracking different nuts of different sizes and as a nut N falls into funnel-shaped space 52A, it stops at some appropriate level depending on its size. The lowermost space between the surfaces 61A can be sized to accept almonds, for example. The middle space between the surfaces 60A can be sized to accept filberts, pecans and larger almonds, for example, or even small Brazil nuts. The upper portion or space between the surfaces 59A can be sized to accept large Brazil nuts, walnuts and larger pecans, for example.

Figure 24:
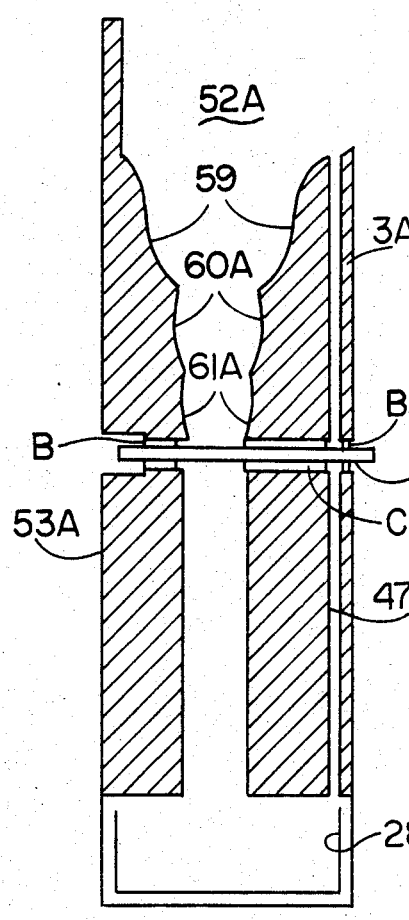
FIGS. 24, 25 and 26 are cross-section views of a third embodiment of the invention and show the components thereof in various operating positions.
Figure 25:
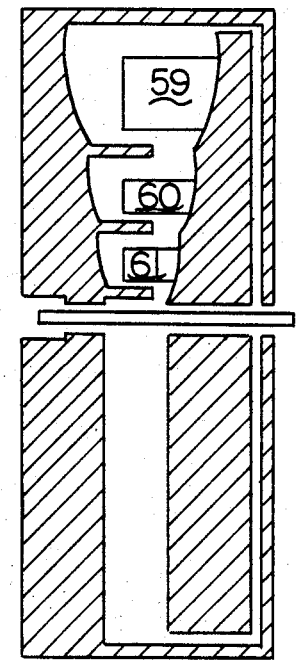
Figure 26:
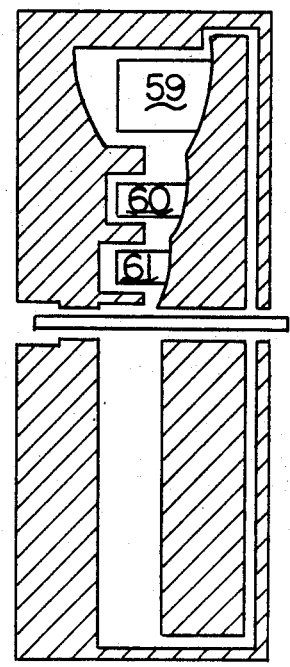
Figure 27:
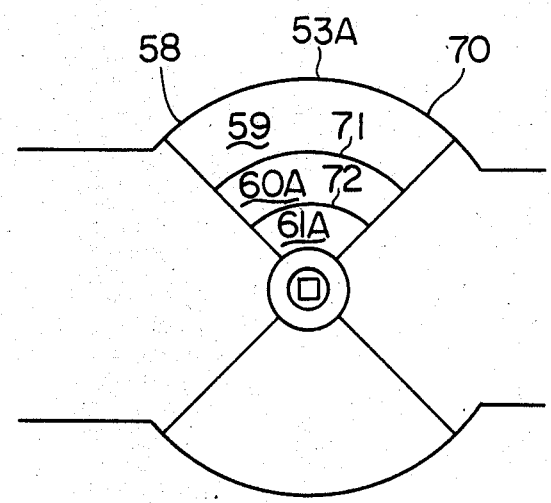
FIG. 27 is an elevation view of the inner surface of the stationary disc of the third embodiment.
Figure 28:
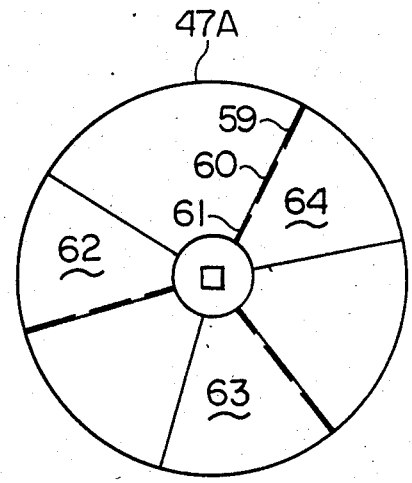
FIG. 28 is a view similar to FIG. 27 of the rotatable disc of the third embodiment.

In FIGS. 24, 25 and 26 three such spaces have been shown but it is to be understood that more spaces could be provided, if desired. The mechanics of breaking the nut shell have already been explained in connection with the first embodiment and is substantially the same for the third embodiment. After the nut N moves to the general area 58 of member 53A, according to the size of the nut and the space its trapped in, it will be guided into the appropriate one of the tracks in area 58 between the tapered guide walls 70, 71 and 72. As is shown in FIGS. 25, 26 and 27, the space becomes narrower in two directions or dimensions to the point where the nut shell will crack and be fragmented. The blades or projections 59, 60 and 61 push the nut along the appropriate track between the guide rails or walls. FIG. 28 shows that moveable disc 47A comprises three areas designated 62, 63 and 64 for accepting nuts and also shows the arrangement of the blades 59, 60 and 61.

Motor Control

Figure 3B:
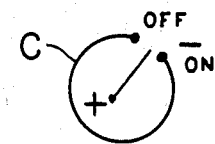

FIG. 3A is a diagram of the electrical control circuit for motor 3 shown in FIG. 1. FIG. 3B is an enlarged detail view of the motor-driven switch C of FIG. 3A. Motor 3 can be operated in any one of several ways. Closure of switch K will cause motor 3 to run until switch K is reopened. Switch P is used when a small quantity of nuts (one or two) are placed in a nutcracker and the user wants the motor 3 to turn off automatically after a short period of time, assuming that by then the nuts are cracked. Closure of switch P energizes time-delay relay A effecting closure of relay contact A until the time delay relay effects reopening. More specifically, while relay contact A is momentarily closed, motor 3 drives rotary switch C from the OFF position shown in FIGS. 3A and 3B to ON position and as the movable switch arm makes contact with the near-circular contact, the motor 3 will cause the rotatable component of the nutcracker to rotate 360 degrees and then stop.

In the above-described system motor 3 can be started at the touch of a buttom and the cycle is automatically completed. If, however, relay A was eliminated, switch C would respond to sufficiently long closure of switch P to effct operation if switch P were placed in the former location of relay contact A.

It is to be understood that in nutcrackers adapted for cracking a large quantity of nuts an extension chute (not shown) could be provided for the unit and sized to suit the needs of the user.

I claim:

1. A nutcracker comprising:
 a pair of relatively movable members, said members include adjacent confronting surfaces which cooperate to define a nut-receiving chamber;
 means for mounting said members for relative movement and for maintaining said members in predetermined spaced apart relationship;
 restricting means on the adjacent confronting surfaces of said members which cooperate to diminish said nut-receiving chamber in size as said members are moved relative to each other, said chamber diminishing in size from a first size sufficient to accommodate a whole nut to a second size whereby the nut is crushed; and
 means on one of said members for preventing passage of the nut beyond a predetermined degree of rotation of said members.

2. A nutcracker according to claim 1 wherein said restricting means comprises a first component on one member whereby said chamber is reduced in size in one dimensions.

3. A nutcracker according to claim 2 wherein said restricting means further comprises a second component on said one member whereby said chamber is also reduced in size in another dimension.

4. A nutcracker according to claim 2 wherein said first component comprises a sloped groove.

5. A nutcracker according to claim 3 wherein said first component comprises a sloped groove and said second component comprises a wall of increasing thickness.

6. A nutcracker according to claim 3 wherein said first and second components each comprises a barrier member which extends into the space between said relatively movable members, and further including means for automatically adjusting the position of the barrier members to accommodate the size of a nut.

7. A nutcracker comprising:
 a stationary member including a first surface;
 a rotatable member including a second surface;
 means including a shaft mounted on said stationary member for rotatably supporting said rotatable member;
 a sloped groove formed in the first surface of the stationary member confronting said rotatable member;
 a recess formed in the second surface of the rotatable member confronting said stationary member;
 said groove and said recess cooperating to define a nut-receiving chamber which diminishes in size as said members are relatively rotated, said chamber diminishing in size from a first size sufficient to accommodate a whole nut to a second size whereby the nut is crushed; and means on said stationary member for preventing passage of the nut beyond a predetermined degree of rotation of said rotatable member.

8. A nutcracker according to claim 7 further including a wall of increasing thickness mounted on said stationary member and disposed transversly to said groove whereby said chamber diminishes in size in two dimensions as said rotary disc rotates.

9. A nutcracker according to claim 8 further including a projection adjacent said recess in said rotatable member for moving a nut relative to said stationary member.

10. A nutcracker according to claim 9 wherein said stationary member comprises an inlet chute and an outlet chute.

* * * * *